United States Patent
Leen et al.

(10) Patent No.: US 8,600,658 B1
(45) Date of Patent: Dec. 3, 2013

(54) BICYCLE DIRECTIONS

(75) Inventors: John M. Leen, Seattle, WA (US); Scott T. Shawcroft, Seattle, WA (US); Iljya Kalai, Seattle, WA (US); Andrew M. Schwerin, Seattle, WA (US); Jonah Jones, San Francisco, CA (US)

(73) Assignee: Google Inc., Mountain View, CA (US)

( * ) Notice: Subject to any disclaimer, the term of this patent is extended or adjusted under 35 U.S.C. 154(b) by 530 days.

(21) Appl. No.: 12/786,839

(22) Filed: May 25, 2010

Related U.S. Application Data (60) Provisional application No. 61/312,649, filed on Mar. 10, 2010.

(51) Int. Cl.
*G01C 21/36* (2006.01)

(52) U.S. Cl.
USPC .............. 701/400; 701/533; 701/410

(58) Field of Classification Search
USPC ......... 701/400, 409–411, 416–419, 532, 538, 701/533, 1, 117, 446; 340/903; 707/E17.018, E17.044
See application file for complete search history.

(56) References Cited

U.S. PATENT DOCUMENTS

| | | | | |
|---|---|---|---|---|
| 6,188,957 | B1 * | 2/2001 | Bechtolsheim et al. | 701/446 |
| 6,411,896 | B1 * | 6/2002 | Shuman et al. | 701/431 |
| 6,463,385 | B1 * | 10/2002 | Fry | 701/468 |
| 2004/0039522 | A1 * | 2/2004 | Jwo | 701/208 |
| 2005/0125149 | A1 * | 6/2005 | Tada | 701/210 |
| 2007/0265770 | A1 * | 11/2007 | Hirose | 701/202 |
| 2007/0288155 | A1 * | 12/2007 | Kaneda | 701/200 |
| 2008/0126207 | A1 * | 5/2008 | Brown | 705/14 |
| 2009/0228207 | A1 * | 9/2009 | Sasano | 701/210 |
| 2010/0198508 | A1 * | 8/2010 | Tang | 701/210 |

FOREIGN PATENT DOCUMENTS

| | | | | |
|---|---|---|---|---|
| JP | 2004240543 | * | 8/2004 | ............... G08G 1/00 |
| JP | 2006275922 | * | 10/2006 | ............. G01C 21/00 |

OTHER PUBLICATIONS

Citizens for Progressive Transit, "Plan your Transit/Bicycle/Walking Trips Online," Sep. 22, 2007, 1 page, [online] [retrieved on Sep. 27, 2011] Retrieved from the internet <URL:http://www.cfpt.org/node/256>.

Annie, "The A-Train Trip Planner," Atlanta Metblogs, Nov. 27, 2007, 6 pages, [online] [retrieved on Sep. 27, 2011] Retrieved from the internet <URL:http://atlanta.metblogs.com/2007/11/27/the-a-train-trip-planner/>.

"Bicycle Speed (Velocity) And Power Calculator," www.kreuzotter.de, last modified Sep. 11, 2008, 3 pages, [online] [retrieved on Apr. 20, 2011] Retrieved from the internet <URL:http://www.kreuzotter.de/english/espeed.htm>.

* cited by examiner

*Primary Examiner* — Marthe Marc-Coleman
(74) *Attorney, Agent, or Firm* — McDermott Will & Emery LLP (57) ABSTRACT

A mapping system tailors maps and directions for bicyclists. The mapping system stores map data including data about the suitability for biking along roads in a road network. A cost model, including a turn model, a hill model, and a penalty/bonus model is applied to the road network. The turn model models how long it takes to traverse an intersection. The hill model models a bicyclist's speed based on the road grade. The penalty/bonus model adjusts the calculated cost of a road segment under the turn model and hill model to take account of steep hills and other unfavorable or favorable conditions along the road segment for bicycling. The mapping system generates one or more routes between an origin and destination. The generated route that has the lowest adjusted cost is determined to be a recommended route. The mapping system formats maps and/or directions to display recommended routes.

30 Claims, 8 Drawing Sheets

BICYCLE DIRECTIONS

CROSS-REFERENCE TO RELATED APPLICATION

This application claims priority under 35 U.S.C. 119(e) to U.S. Provisional Application No. 61/312,649, filed Mar. 10, 2010, which is incorporated herein by reference in its entirety.

BACKGROUND

1. Field of Art

This disclosure relates to mapping systems used to plan routes for bicycling.

2. Description of the Related Art

Mapping systems that provide driving, walking, and public transit maps and directions have been widely used. However, typically, mapping systems have not offered customizable maps and directions tailored for bicyclists.

SUMMARY

Embodiments provide a mapping system that tailors maps and directions for bicyclists. The mapping system stores map data including road network data comprising bike trail data, bike lane data, and other data about the suitability for biking along a road. A cost model is applied to the road network to determine estimates for the travel time of road segments in the road network. In one embodiment, the cost model includes a turn model, a hill model, and a penalty/bonus model. The turn model models how long it takes to traverse an intersection. The hill model models a bicyclist's speed based on the road grade. The penalty/bonus model adjusts the calculated cost of a route segment under the turn model and hill model to take account of steep hills and other unfavorable or favorable conditions along the route for bicycling, such as a preference for roads that include bike lanes and an avoidance of arterial roads unless they have a bike lane or are designated as good for bicycling. The mapping system receives user-selected origin and destination points, and generates one or more routes using a shortest path algorithm applied to the road network as adjusted by the cost model. The generated route that has the lowest adjusted cost is determined to be a recommended route between the origin and destination. The mapping system can format one or more recommended routes for display in a map and/or format directions corresponding to the recommended routes.

BRIEF DESCRIPTION OF THE DRAWINGS

Figure ("FIG.") 1A illustrates a computing environment of a mapping system, in accordance with an embodiment.

DETAILED DESCRIPTION

I. Configuration Overview

Figure 1A:
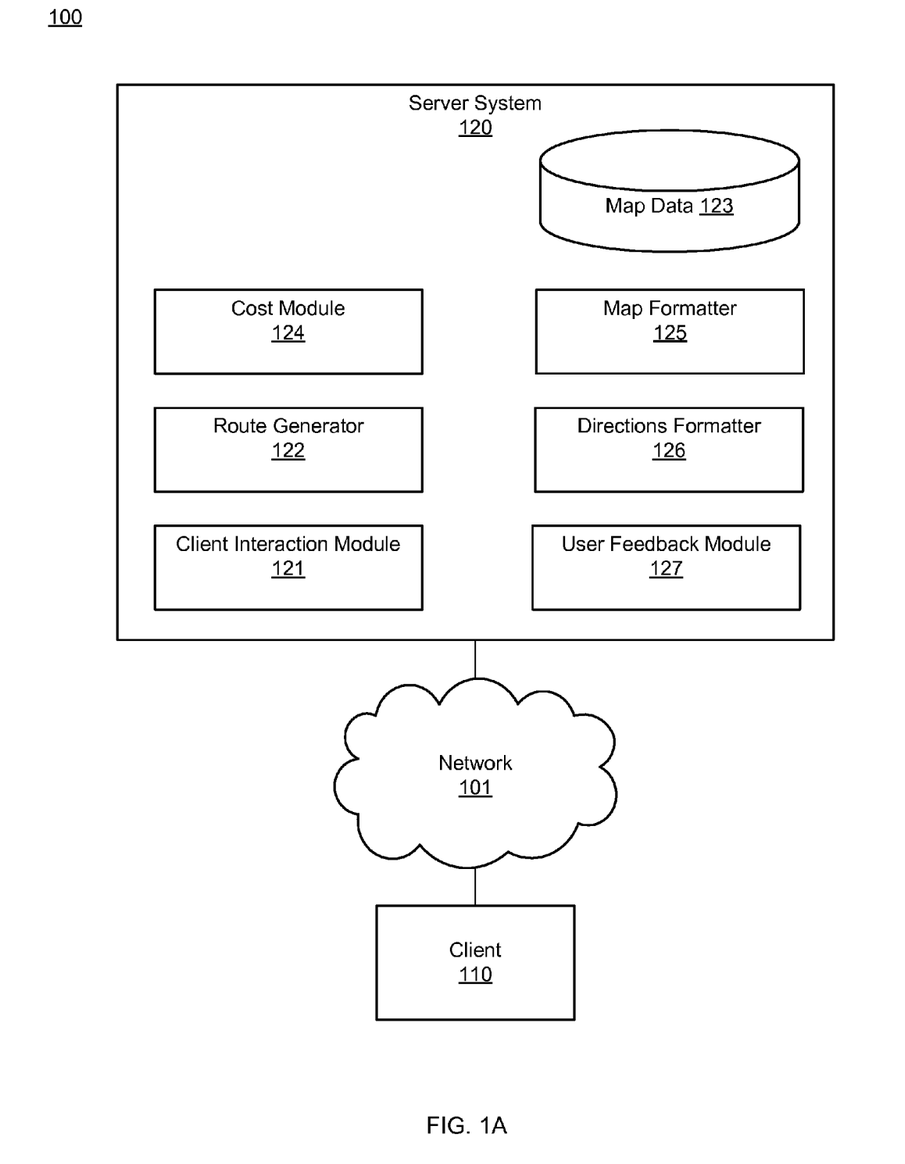

Embodiments disclosed herein provide a mapping system that tailors maps and directions for bicyclists. FIG. 1A illustrates an example computing environment 100 of the mapping system. The computing environment includes a client 110 and a server system 120 connected by a network 101. The network 101 represents the communication pathways between the client 110 and the server system 120. In one embodiment, the network is the Internet. The network 101 can also utilize dedicated, custom, or private communications links that are not necessarily part of the Internet.

The client 110 is a computer or other electronic device used to request bicycle directions or maps. The client 110 can be, for example, a personal computer executing a web browser, or a network-capable device other than a personal computer, such as a personal digital assistant (PDA), a mobile telephone, or the like. The client receives bicycle directions or maps from the server system 120 and displays or otherwise presents them to the user. Although only one client 110 is shown in FIG. 1A for clarity, any number of clients 110 may be similarly connected to the server system 120 though a network 101.

The server system 120 serves bicycle directions and/or maps to the client 110 via the network 101. As shown in FIG. 1A, the server system includes a client interaction module 121, a route generator 122, database of map data 123, a cost module 124, a map formatter 125, a directions formatter 126, and a user feedback module 127.

The client interaction module 121 manages the communications between the client 110 and the server system 120. For example, the client interaction module 121 can receive user-selected origin and destination points for a map of a bicycle route or set of bicycle directions. The client interaction module parses the origin and destination inputs from the client 110 and passes them to the route generator 122.

The route generator 122 receives the selected origin and destination from the client interaction module 121, and generates at least one route between the origin and destination using the database of map data 123. In one embodiment, the route generator applies Dijkstra's algorithm to find one or more shortest paths between the origin and destination. Alternatively, other shortest path algorithms such as the A* algorithm, can be used to find one or more shortest paths or near shortest paths.

The database of map data 123 includes, in one embodiment, all mapping data needed to generate bicycle maps and routes. In other embodiments, the mapping data is housed in a plurality of local and or remote data sources that are accessible by the server system 120. In addition to standard map data including streets, addresses, intersections, geographical features, points of interest, and the like, the map data also includes map data of particular interest to bicyclists, including information about the type of road (bike trail, presence of bike lanes, recommended roads for bicyclists), terrain, degree of traffic on roads and intersections, and the like. In one embodiment, locations of particular interest to bicyclists, for example the locations of bike racks and/or bike shops are also included in map data 123. The use of the map data 123 of particular interest to bicyclists will be described in further detail with respect to the cost model below.

Figure 1B:
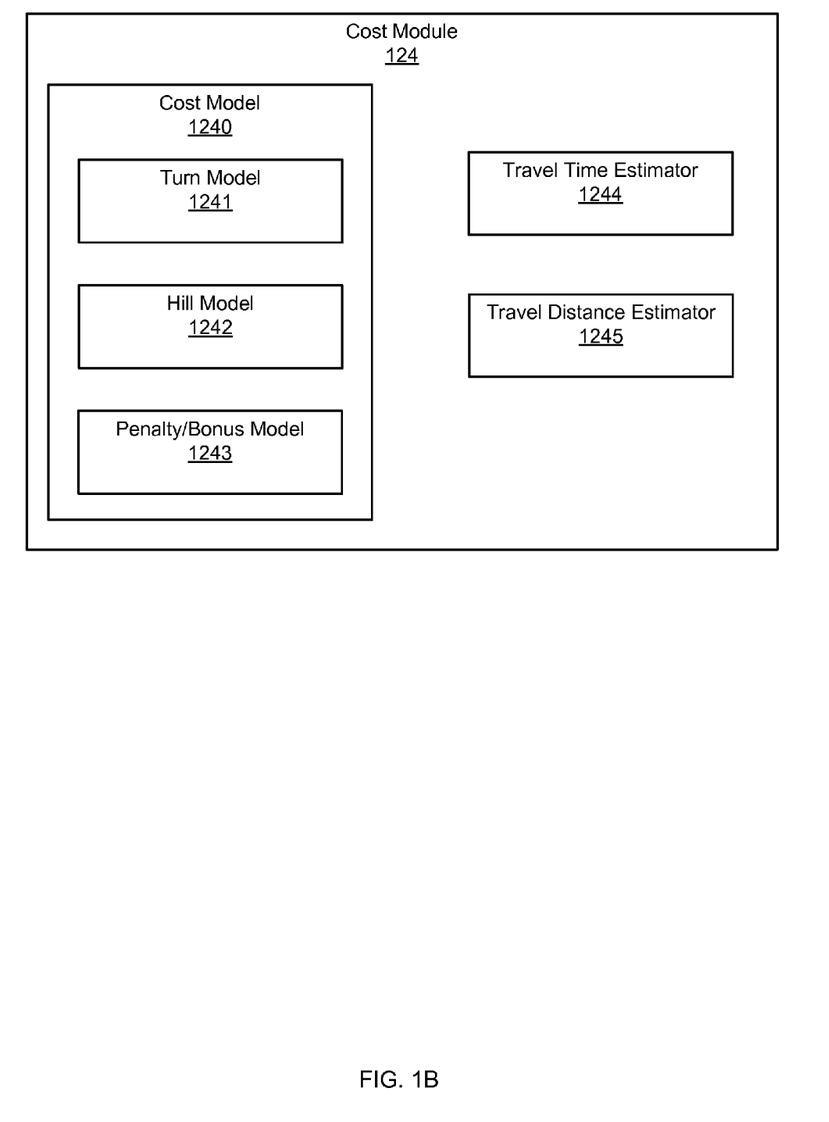
FIG. 1B illustrates an example embodiment of a cost module of the server system.

The cost module 124 determines the cost to allocate to each portion of a road network in order to determine one or more recommended routes generated by route generator 132, for bicycling between the origin and destination. Details of an embodiment of the cost module 124 are shown in FIG. 1B, and the operation of the cost module 124 is described in detail in Section II.

Referring back to FIG. 1A, the server system 120 also includes the map formatter 125. The map formatter formats the map showing one or more recommended routes for bicyclists for delivery to the client 110. In various embodiments, features of interest to bicyclists may be emphasized on the map, for example by including the features in a distinguished color, font, or other mechanism to draw attention to the features. Additionally or alternatively, highways or other roads that are not recommended for bicyclists can be faded out, shaded, or otherwise marked to de-emphasize them.

The directions formatter 126 formats the directions of one or more recommended routes for bicyclists for delivery to the client 110. In one embodiment, the directions may comprise textual turn by turn or step by step descriptions with or without estimated distances and with or without estimated travel times.

The user feedback module 127 receives user feedback on the recommended routes for bicyclists or feedback from users concerning updates or corrections to the map data. In one embodiment, the user feedback received is queued for review by an administrator to determine updates to the map data stored in database 123.

Figure 2:
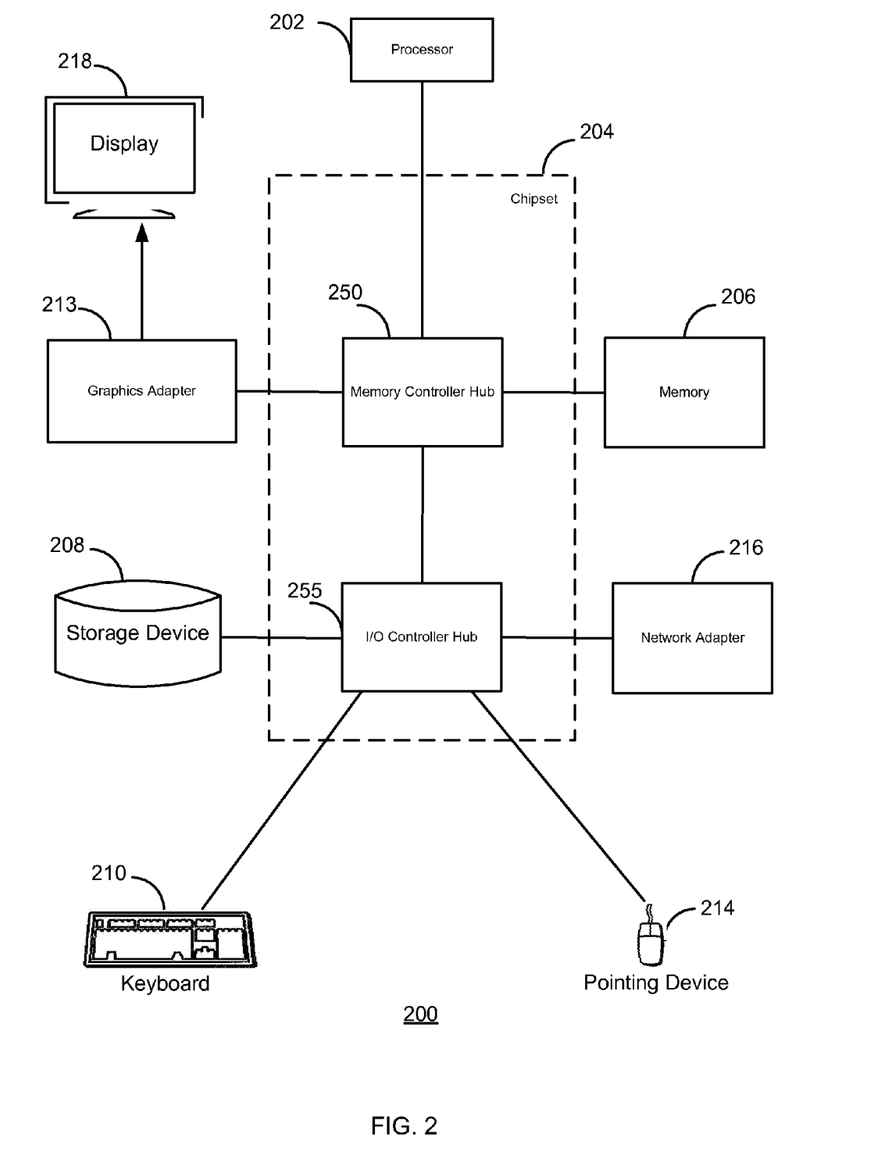
FIG. 2 is a high-level block diagram illustrating an example of a computer for use as a client and/or a server system of FIG. 1A.

FIG. 2 is a high-level block diagram illustrating an example of a computer 200 for use as a client 110 and/or a server system 120 of FIG. 1A. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. Mechanisms used to convey user input can include, but are not limited to, touchscreen interfaces, touchpads, directional pointing devices, voice controlled interfaces, hardware keyboard shortcuts, directional hardware keys and hardware elements such as wheels and rolling balls. The graphics adapter 213 displays images and other information on the display device 218. In some embodiments, the display device 218 includes a touch screen capability for receiving user input and selections. The network adapter 216 couples the computer system 200 to the communications network 101. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1A can vary depending upon the embodiment and the processing power used by the entity. For example, a client device 110 that is PDA typically has limited processing power, a small display 218, and might lack a pointing device 214. The server system 120, in contrast, may comprise multiple blade servers working together to provide the functionality described herein.

II. Modeling Costs of Bicycle Routes

FIG. 1B illustrates an example embodiment of a cost module of the server system 120. The cost module 124 determines the costs in terms of time and distance of bicycling the roads in the road network. In one implementation, the cost model uses a combination of the following attributes to determine the suitability of a route for bicycling: distance, altitude variation over distance (i.e., grade), traffic (e.g., amount of road traffic or speed of road traffic), and road suitability for bikes (e.g., considering whether the road has a bike lane, a wide shoulder, the riding surface, whether bikes are prohibited, etc.). As shown in FIG. 1B, the cost module can include a cost model 1240, a travel time estimator 1244, and a travel distance estimator 1245.

The cost model 1240 determines an adjusted cost to assign to a portion of a road network. The cost model 1240 comprises a turn model 1241, a hill model 1242, and a penalty/bonus model 1243.

The turn model 1241 models how many seconds it takes to traverse an intersection, whether by crossing the road or by making a turn. The turn model considers the geometry of an intersection, including the number, size, and position of roads coming together at the intersection, which allows an estimation of the statistical average wait time for crossing the street. In one embodiment, a turn model used for estimating turn costs for driving routes can be used by modifying the acceleration and deceleration assumptions applied for cars to ones appropriate for bicycles. For example, an acceleration of 0.3626 m/s$^2$ can be applied when continuing on from an intersection, and a deceleration of 0.784 m/s$^2$ can be applied to account for braking or stopping at an intersection.

The hill model 1242 models a bicyclist's speed based on the road grade. In order to understand the hill model 1242 in context, first some basic definitions and selected constants will be described. All units are in meters, kilograms, and seconds, unless otherwise specified. The constants are merely examples, and other values for the constants may be selected, as will be apparent to one of ordinary skill in the art.

| Description | Constant Name | Value |
|---|---|---|
| Acceleration due to gravity | kGAcceleration | 9.8 |
| Acceleration of the cyclist while continuing on from an intersection | kAcceleration | 0.037 * kGAcceleration |
| Deceleration of the cyclist while stopping at an intersection | kDeceleration | −0.08 * kGAcceleration |
| Frontal area of the cyclist | kFrontalArea | 0.5 square meters |
| Drag coefficient of the cyclist in the atmosphere | kDragCoefficient | 0.9 |
| Mass of bicycle and rider | kBicycleAndRiderMass | 80 |
| Density of air | kAirDensity | 1.2 kg/m$^3$ |
| Rolling coefficient | kRollingCoefficient | 0.007 |
| Maximum grade | kMaxGrade | 0.4 |
| Target velocity (how fast the cyclist typically wants to go) | kTargetVelocity | 12 MPH |
| Maximum velocity (at which the cyclist will coast without applying brake) | kMaxVelocity | 18 MPH |

-continued

| Description | Constant Name | Value |
|---|---|---|
| Walking velocity | kWalkingVelocity | 2.5 MPH |
| Maximum power (the cyclist is willing to exert) | kCyclistMaxPower | 120 watts |
| Minimum power (the cyclist can exert) | kCyclistMinPower | 0 watts |

Using the above constants, the typical speed and power output of the cyclist can be defined. The target velocity is how fast the cyclist typically wants to go. If a cyclist is slower than this rate, the cyclist will typically pedal harder, but only up to a point, because there is also a cap on how many watts of power a typical cyclist is willing to exert. In the case that a cyclist simply cannot pedal hard enough up a hill, the cyclist will get off the bicycle and walk. Thus, the value for a typical walking speed is also used. Additionally, there is a defined a maximum velocity at which a cyclist desires to coast; if a downhill makes the cyclist accelerate beyond this maximum velocity, the cyclist will apply the brake.

The power required for the target velocity on a level surface can be computed from the following:

kCyclistDefaultPower=kTargetVelocity*
(0.5*kDragCoefficient*kFrontalArea*kAirDensity*k
TargetVelocity^2+k
BicycleAndRiderMass*kGAcceleration*kRollingCoefficient)

The hill model 1242 is derived from a speed computation from the road grade. For purposes of explanation, a coordinate system is established with the x-axis running along the inclined plane of the road with positive x values going to the right, and the y-axis extends in a direction normal to the inclined plane, with positive y values going above the x-axis. Thus, the gravity forces can be defined:

force_g_x=−force_g*sin(atan(grade))

force_g_y=−force_g*cos(atan(grade))

wherein force_g is the force of gravity, force_g_x is the force of gravity in the x direction, and force_g_y is the force of gravity in the y direction, and grade is the angle of the incline plane of the road (i.e., the grade of the road).

The following trigonometric identities simplify the calculations:

sin(atan(x))=x/sqrt(1+x^2)

cos(atan(x))=1.0/sqrt(1+x^2)

According to Newton's second law of motion:

force_g=kBicycleAndRiderMass*kGAcceleration.

Therefore, by substitution, force_g_x=−force_g*(grade/sqrt(1+grade*grade));
and force_g_y=−force_g*(1.0/sqrt(1+grade*grade));

Next, the rolling resistance, force_rolling_resistance, can be computed. The normal force is equal in magnitude to the force of gravity in the y direction by choice of the coordinate system. Thus, force_rolling_resistance=−
kRollingCoefficient*force_g_y;

Some additional variables are defined for the model as follows:

| Variable | Description |
|---|---|
| V | Velocity |
| P | Power |
| Cw | Drag coefficient (also referred to as kDragCoefficient above) |
| A | Total frontal area of cyclist and bicycle (also referred to as kFrontalArea above) |
| rho | Air density (also referred to as kAirDensity) |

The force of gravity and rolling friction, Fstg, is defined as:

Fstg=force_rolling_resistance−force_g_x

The following formula for power is then used:

P=V*[(Cw*A*rho*V^2)/2+Fstg]

Therefore,

0=0.5*(Cw*A*rho*V^3)+(Fstg*V)−P     (Eq. 1)

Eq. 1 is solved for V using the cubic formula, where ci denotes the coefficient of v^i:

$c_3*v^3+c_2*v^2+c_1*v+c_0$.

In equation 1, there is no V^2 term, so c2 is 0, and c3, c1, and c0 are as follows:
c3=0.5*kDragCoefficient*kFrontalArea*kAirDensity;
c1=force_rolling_resistance−force_g_x;
c0=−power;

Given a cubic equation in this form, there might be multiple real solutions. If there is only one solution found, then the one value of V is returned. Alternatively, three real solutions may exist. (Note that these are the only cases: one or three solutions). If three solutions exist, then it is determined which solutions are extraneous by determining which solution is the only solution that makes sense with the other assumptions of the model. Two observations are used: (1) the cubic equation is a depressed cubic and it can be verified that the sum of the roots of a depressed cubic is always 0; and (2) it is expected that the velocity increases with increased power.

At least one of the roots must be non-negative according to observation (1). Also, at least one of the roots must be non-positive according to observation (1). If one of the roots is non-positive, then certainly the left most root on a graph of the cubic is non-positive. Accordingly, the non-positive solution is discarded, which leaves only the middle and right most root.

Increasing the power makes the constant term smaller which amounts to shifting the cubic down on a graph, and causing its outer roots (left most and right most roots) to increase in magnitude. Conversely, the middle root would decrease, which contradicts observation (2). Hence, the middle root must also be extraneous. Accordingly, the largest root is returned as the one value of V.

The following program code is an example for defining speed from grade using the constants, variables, and assumptions above:

```
double BicyclingCostModel::GetSpeedFromGrade(double grade) {
    double const max_power_velocity =
        GetSpeedFromGradeAndPower(grade, kCyclistMaxPower);
    double const typical_power_velocity =
        GetSpeedFromGradeAndPower(grade, kCyclistDefaultPower);
```

-continued

```
    if (kTargetVelocity > max_power_velocity) {
        return max_power_velocity;
    } else if (typical_power_velocity >= kTargetVelocity) {
        return typical_power_velocity;
    }
    return kTargetVelocity;
}
```

As a result of this function, given the steepness of the road, the speed at which the typical cyclist will travel the road can be determined. The function takes into account that the typical cyclist will go slower on a steep uphill. The function does not yet take into account that the typical cyclist will slow themselves down on purpose if it's a steep downhill.

Next, the cost model 1240 of the cost module 124 computes an estimated time in seconds for biking a particular road segment of the road network. Then the penalty/bonus model 1243 adjusts the estimate of the cost to apply recommendations for routes that avoid steep hills and unfavorable conditions for cyclists. In the following descriptions, "run" refers to the length of the road segment and "grade" refers to the steepness of the road segment, which are both derived from the map data 123. From the description above,
velocity=GetSpeedFromGrade(grade);
travel_time=run/velocity;
penalty=0;
wherein travel_time is the estimated travel time to travel the length of the run at the velocity determined by the steepness of the grade. The travel_time may be adjusted through the functions described below. In addition, the starting penalty for a road segment is zero, but it may increase or decrease through adjustments described below.

As discussed above, the maximum velocity is capped at kMaxVelocity since the average cyclist will start to use the brakes when going too fast. Additionally, needing to apply the brakes is penalized in one embodiment. The penalty is the difference between the number of seconds required to traverse the route segment at max_velocity_for_grade and the number of seconds required when the cyclist is exerting kCyclistMinPower, which is 0 watts. The max_velocity_for_grade is computed from grade and kMaxVelocity. Usually max_velocity_for_grade is the same as kMaxVelocity, but max_velocity_for_grade can decrease on steep downhills to account for the fact a cyclist may apply the brakes. The penalty increases with the increasing steepness of the downhill grade, but in one embodiment, it is capped to ⅓ of the final travel time. If the downhill grade is steep enough, the maximum velocity is further limited as a linear function of the grade. In one embodiment, a typical cyclist starts slowing down at a 6% downhill grade, and reaches kWalkingVelocity around 18% downhill grade. Below a threshold, the cyclist makes better time by walking the bike, so the travel time is determined using the kWalkingVelocity for those portions. Additionally, if the uphill grade is steep, an additional penalty is added in some embodiments. For example, at a grade of 9%, at the target power output, the cyclist drops below the speed of walking. At 13%, even at max power, the cyclist drops below walking speed. Accordingly, a penalty can be introduced that scales linearly with grade, starting at 0× at a 9% grade, and peaking at 0.5× at a 13% grade. This penalty actually grows faster than linearly because it is multiplied by the travel time, which is itself a function of grade. The following is a sample code section for implementing these penalties based on the steepness of the road:

```
if (velocity > kMaxVelocity) {
    double max_velocity_for_grade = kMaxVelocity;
    if (grade < -0.06) {
        max_velocity_for_grade =
            max(kWalkingVelocity, kMaxVelocity + 60 * (grade + 0.06));
    }
    double capped_travel_time = run / max_velocity_for_grade;
    double min_power_velocity =
        GetSpeedFromGradeAndPower(grade, kCyclistMinPower);
    if (min_power_velocity > max_velocity_for_grade) {
        double min_power_travel_time = run / min_power_velocity;
        penalty += min(capped_travel_time - min_power_travel_time,
            capped_travel_time / 3);
    }
    travel_time = capped_travel_time;
} else if (velocity < kWalkingVelocity) {
    travel_time = run / kWalkingVelocity;
}
if (grade > 0.09) {
    penalty += min(0.5, 12.5 * (grade - 0.09)) * travel_time;
}
```

The penalty/bonus model 1243 further applies penalties and bonuses for the suitability of the road for bicycling. For example, if the road is a dedicated bike trail like Seattle's Burke-Gilman, a −50% bonus can be applied, for example by deducting half of the road's cost, making it appear "shorter" than it really is. If the road has a bike lane or is otherwise designated as a good biking road (for example by a bike map prepared by the City in which the road exists), a −25% bonus can be applied. If the road is a terminal road (e.g., a residential cul de sac or minor city grid street, for example), a −25% bonus can be applied.

Conversely, the account for the unfavorable conditions for bicyclists likely to occur on busy streets, if the road is an arterial road for a City or other area, a +23% penalty can be applied, unless it also has a bike lane or a designation as a good biking road described above. In other words, in one embodiment, the penalty applied almost cancels out the bonus that has been applied. If a road has a "caution" designation (for example, being shown on a map as being especially bad for biking or being reported by cyclists as being especially bad or dangerous, for example due to high speed traffic, poor visibility, and/or narrow traffic lanes), a +30% penalty can be applied. In one embodiment, these two penalties are additive if the road is both an arterial road with a caution. Finally, if the road is a limited-access road (for example, a freeway or the like), the penalty/bonus model 1243 entirely prohibits including the road in a recommended route unless there is also a bike lane or a designation as a good bike road. The above penalty and bonus numbers are provided merely as examples, and higher or lower numbers and more or less penalty and bonus conditions may be used to tailor the results, as will be recognized by one of ordinary skill in the art. In one embodiment, adjustments to the penalties and bonuses can be tested by asking cyclists to evaluate the recommended routes generated under different penalty and bonus amounts.

The travel time estimator 1244 of the cost module 124 estimates the total travel time for a route from the sum of the travel times for all the route segments, including the estimates for traversing intersections of the route computed using the turn model 1241 and estimates for traveling the route segment using the hill model 1242. In one embodiment, the travel time estimator 1244 does not consider the costs as modified by the penalty/bonus model 1243 in the travel time estimate. The travel time estimate may be communicated to the directions formatter 126 to be formatted for display with the directions to the user.

The travel distance estimator 1244 of the cost module 124 combines the run lengths of the route segments to estimate the total travel distance for a route. This estimate may also be communicated to the directions formatter 126 to be formatted for display with the directions to the user.

III. Providing Bicycle Routes

Figure 3A:
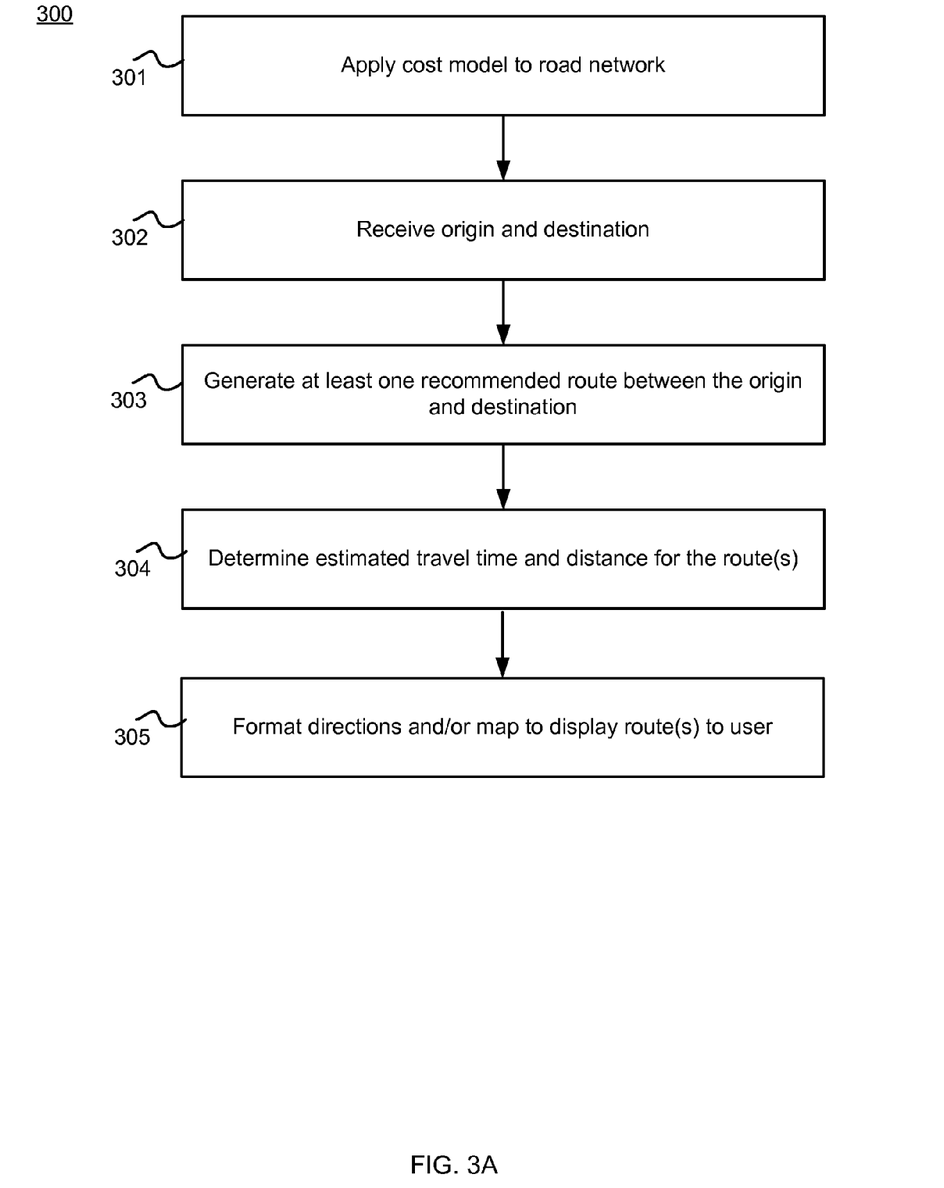
FIG. 3A illustrates an example method of providing a bicycle route, in accordance with an embodiment.
Figure 3B:
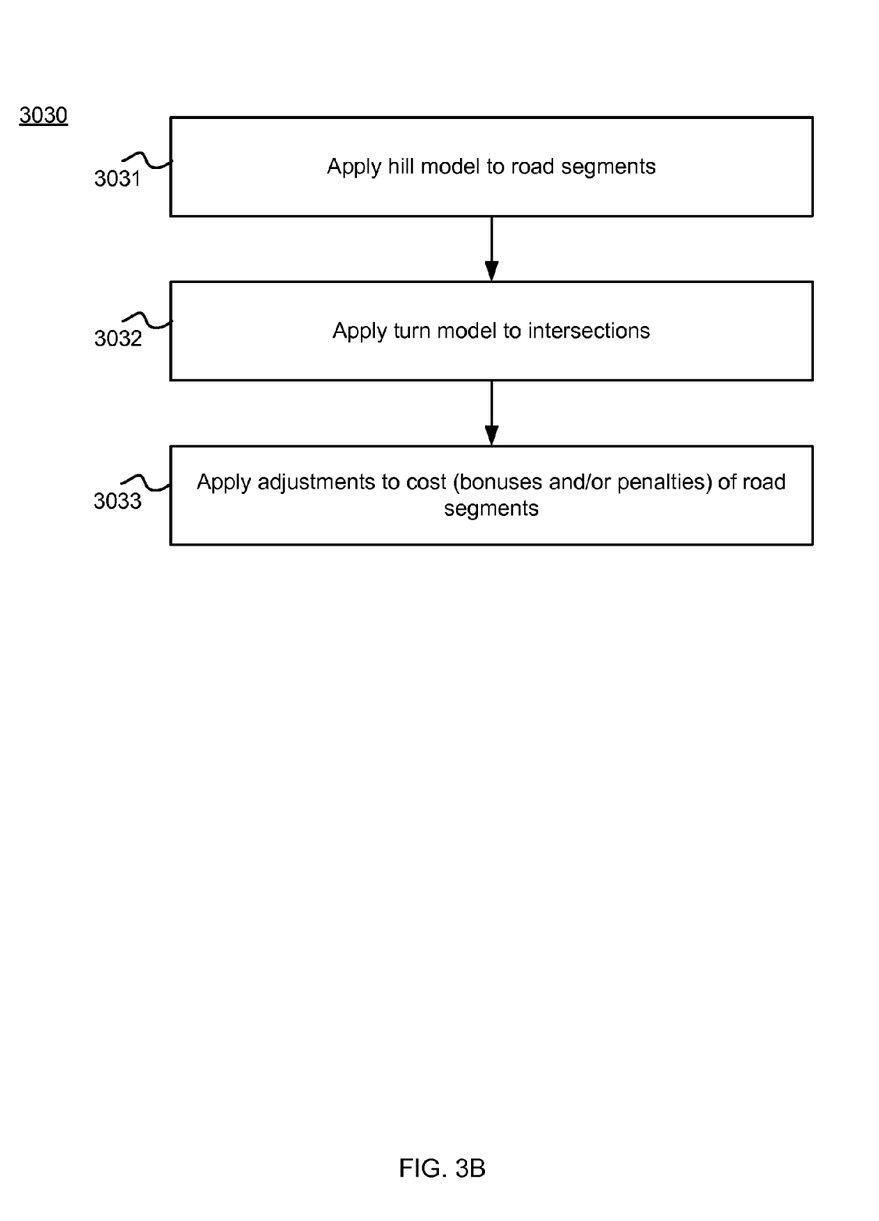
FIG. 3B illustrates an example method of applying a cost model to a road network, in accordance with an embodiment.

FIG. 3A illustrates an example method 300 of providing a bicycle route, in accordance with an embodiment. In step 301, a cost model is applied to the road network. FIG. 3B illustrates an example method of applying a cost model to a road network in more detail.

Figure 4:
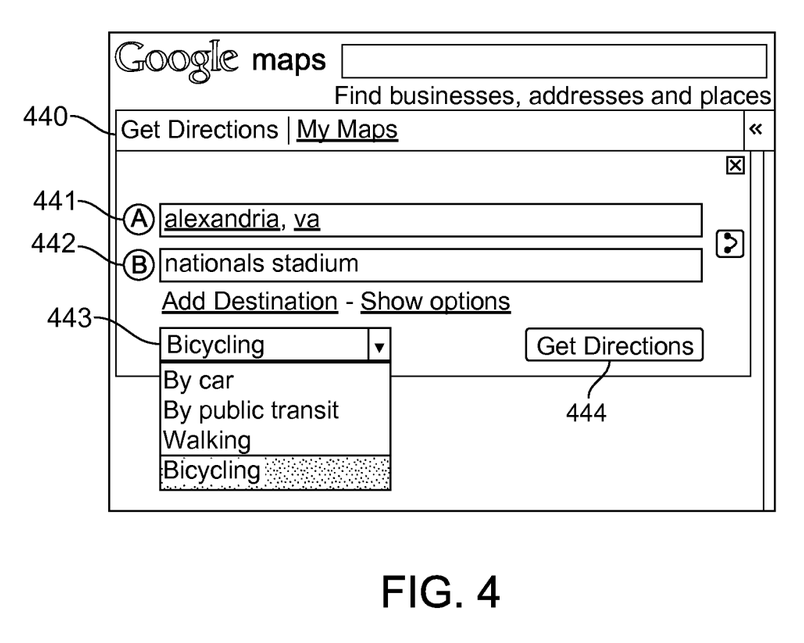
FIG. 4 illustrates an example portion of a user interface for receiving an origin and destination, in accordance with an embodiment.

Referring back to FIG. 3A, in step 302, the origin and destination for a desired route are received at the server system 120, for example from a client 110 through the client interaction module 121 of the server system 120. The origin and destination may comprise a geolocation, coordinates, a city, an address, or any other point of interest that is capable of being recognized as corresponding to the map data 123 of the server system 120. FIG. 4 illustrates an example portion of a user interface 40 for receiving an origin 441 and destination 442, in accordance with an embodiment. In this example, the user can select from a drop down menu 443 that the user desires bicycling directions between the origin 441 and destination 442, and selects a button 444 to submit the origin 441 and destination 442 to the server system 120.

In step 303, at least one recommended route is generated between the original and the destination, for example, using the route generator 122. As described above, one or more recommended routes are generated using a shortest path algorithm applied to the road network as adjusted by the cost model. The route having the lowest adjusted cost is determined to be a recommended route. Optionally, an additional one or more routes with the next lowest adjusted costs can be determined to be alternative recommended routes.

In step 304, optionally, an estimated travel time and distance for the one or more recommended routes can be determined. In one embodiment, the estimated travel time and distance are calculated using the travel time estimator 1244 and the travel distance estimator 1245. In some cases, the estimated travel time and distance are forwarded within the server system 120 for formatting with the directions and/or map for display.

In step 305, the directions and/or map of the one or more recommended routes between the origin and destination are formatted for display to the user. In one embodiment, the map formatter 125 and the directions formatter 126 of the server system 120 can be used for this purpose. Subsequently, the formatted directions and/or map can be sent to the client 110 through the client interaction module 121. The client 110 receives the directions and/or the map and may display them to the user.

FIG. 3B illustrates an example method 3030 of applying a cost model 1240 to a road network, in accordance with an embodiment. In step 3031, a hill model 1242 is applied to road segments of a road network. The hill model 1242 is applied to calculate the cost in terms of time of traveling road segments given assumptions about a typical bicyclist's speed on various road grades.

In step 3032, a turn model 1241 is applied to intersections of the road network. The turn model 1241 is applied to calculate the cost in terms of time of traversing an intersection, whether by crossing the intersection or by making a turn onto an intersecting road.

In step 3033, adjustments to the cost of various road segments are applied. Examples of the bonuses and/or penalties to apply for favorable or unfavorable conditions for bicyclists are provided above in Section II. As described above, the application of bonuses and penalties allows the system to appropriately weight factors (either positively or negatively) other than time and distance that influence a bicyclist's likely enjoyment or satisfaction with a recommended route, including, for example, steep grades, presence of bike lane, designation as being good for bicycling, etc.

Figure 5:
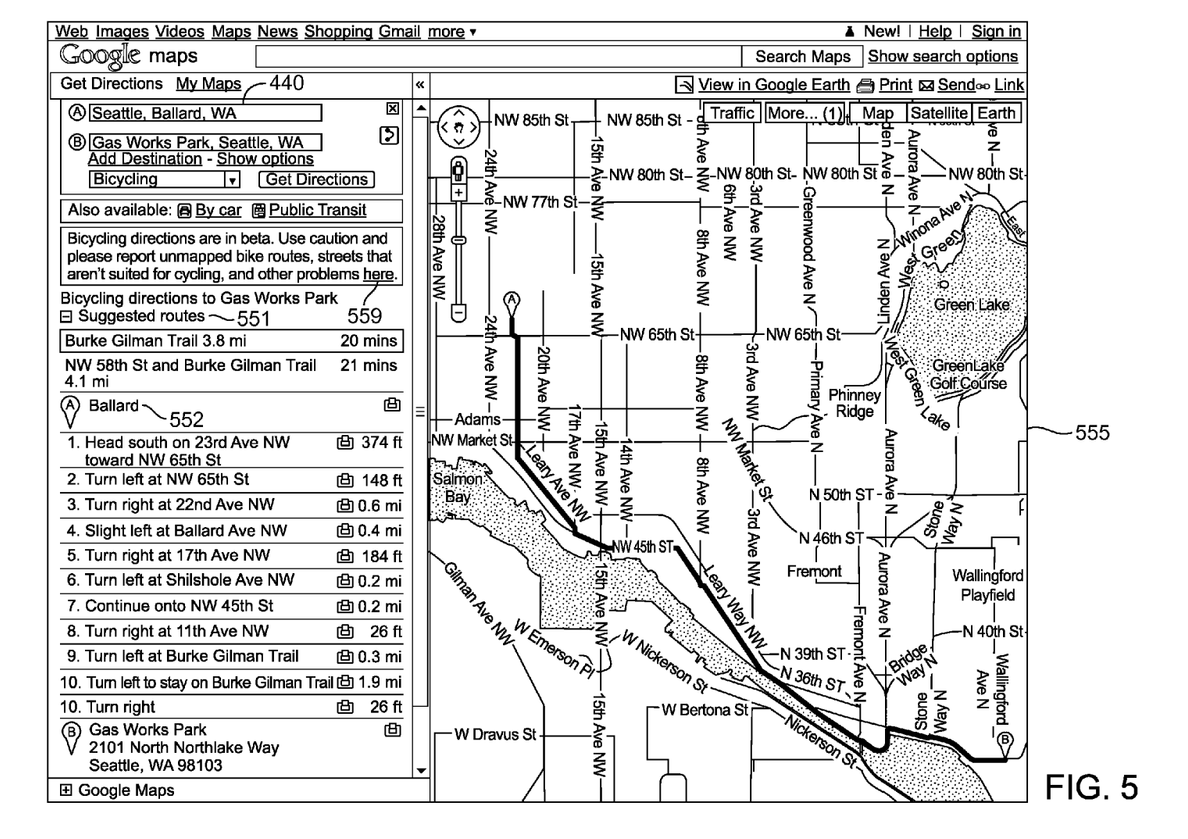
FIG. 5 illustrates a map and directions formatted for display, in accordance with an embodiment.

FIG. 5 illustrates a map 555 and directions 552 formatted for display, in accordance with an embodiment. In this example, the user entered a request for bicycling directions from Ballard to Gas Works Park in Seattle, Wash. using the interface 440. In response to the request, the map 555 is displayed showing a recommended route from Ballard marked as point A on the map 555 to Gas Works Park marked as point B on the map 555. Step by step directions 552 for the displayed recommended route are also presented. Additionally, a summary of an additional recommended route is presented under "Suggested Routes" 551. In one embodiment, the highlighted suggested route 551 is the route displayed on the map 555, and the other routes represent alternatives in summary form. In this example, the summary indicates an alternative route involves NW $58^{th}$ St and the Burke Gilman Trail.

In some embodiments, the user can modify the route displayed on the map 555 by selecting a portion of the route and dragging it to a different location. The estimated travel time and distance update in response to the adjusted route. Optionally, the map 555 can display information that may assist a user in modifying a route, including information about which routes are suitable or preferably for bicycling. For example, dark green lines on the map may indicate a dedicated bike-only trail. Light green lines indicate a dedicated bike lane along a road. Dashed green lines indicate roads that are designated as good or preferred for bicycling, but without dedicated lanes. Other distinctive or distinguished marking techniques or indicators may also be used to indicate these features, such as line colors, thicknesses, dashed or dotted line patterns, and the like in a layer of data from map data 123 that can be overlayed on underlying map data for an area of interest.

Figure 6:
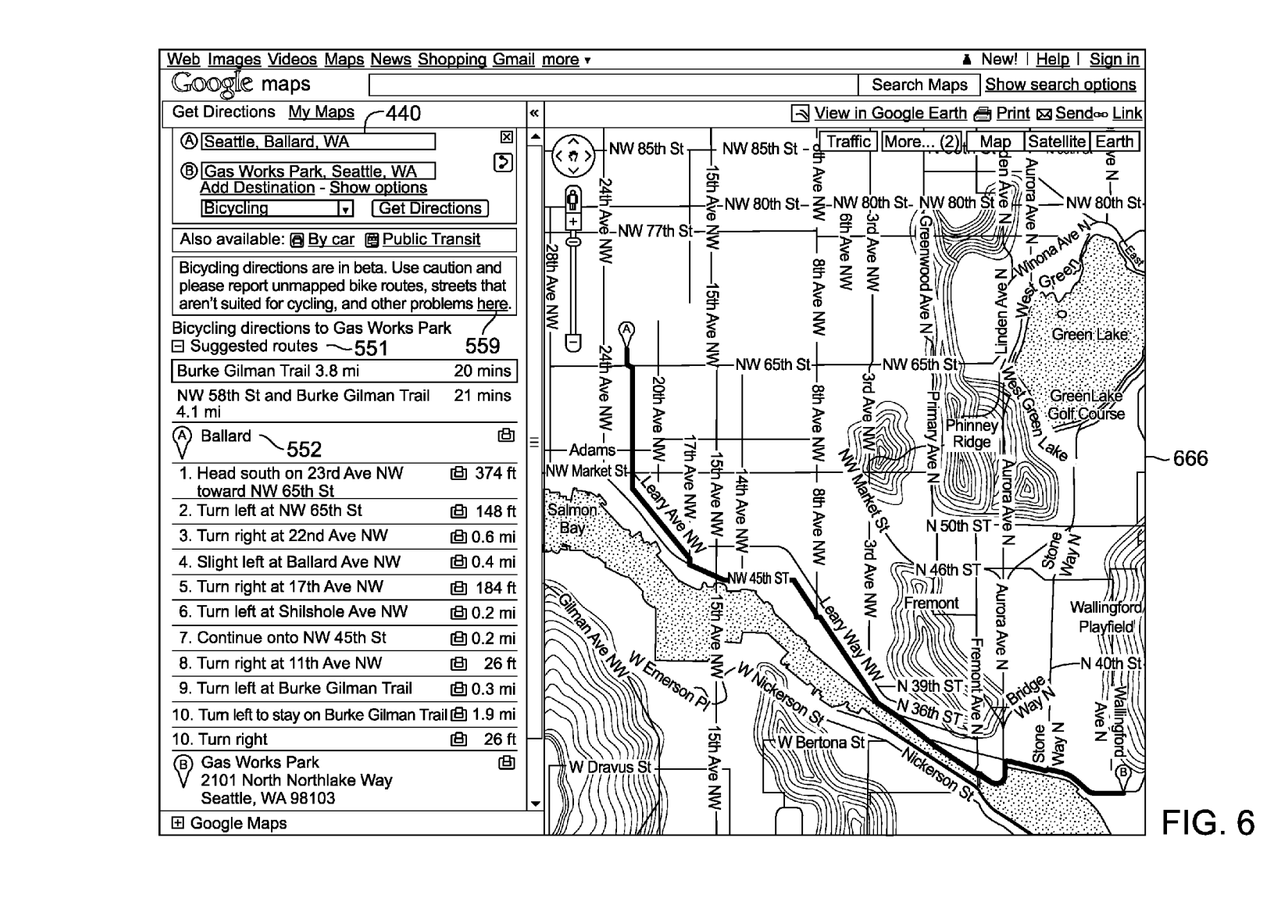
FIG. 6 illustrates the map of FIG. 5 augmented to display terrain data, in accordance with an embodiment.

In one embodiment, a user can optionally view the terrain as another layer of data on a map of a recommended route. FIG. 6 illustrates the map of FIG. 5 augmented to display terrain data, in accordance with an embodiment. By viewing the terrain data in the map 666, the user can judge the hilliness of a proposed route, and may choose to modify a route or select an alternate route on this basis.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention.

What is claimed is:

1. A computer-implemented method of generating a recommended bicycling route, the method comprising:
    applying a cost model to a road network, the cost model including a hill model for estimating a bicyclist's speed on a plurality of road segments in the road network based on a grade of the plurality of road segments;
    determining, for the plurality of road segments, a traversal time based on the bicyclist's speed;
    receiving an origin and destination;

estimating respective total travel times for one or more estimated bicycling routes between the origin and destination based on the traversal times for the plurality of road segments;
determining at least one recommended bicycling route between the origin and destination based on the respective total travel times; and
formatting the at least one recommended bicycling route for display.

2. The method of claim 1, wherein the cost model further includes a turn model for estimating a length of time for a bicyclist to traverse an intersection.

3. The method of claim 1, wherein the cost model further includes a model for applying a bonus to road segments of the road network that are bike trails.

4. The method of claim 1, wherein the cost model further includes a model for applying a bonus to road segments of the road network that include a bike lane.

5. The method of claim 1, wherein the cost model further includes a model for applying a bonus to road segments of the road network that are designated as good for bicycling.

6. The method of claim 1, wherein the cost model further includes a model for applying a penalty to road segments of the road network that are steep downhill grades.

7. The method of claim 1, wherein the cost model further includes a model for applying a penalty to road segments of a road network that are arterial roads.

8. The method of claim 1, wherein generating at least one recommended bicycling route between the origin and destination based on the application of the cost model to the road network comprises selecting a bicycling route having the lowest cost as a recommended bicycling route.

9. The method of claim 1, wherein formatting the at least one recommended bicycling route for display comprises formatting directions corresponding to the at least one recommended bicycling route.

10. The method of claim 1, wherein formatting the at least one recommended bicycling route for display comprises formatting a map including the at least one recommended bicycling route.

11. The method of claim 10, wherein the map comprises distinguished indicators for bike-only trails, roads with bike lanes, and roads designated as good for bicycling.

12. The method of claim 10, further comprising receiving a user modification to a recommended bicycling route displayed on the map, the modification entered by the user dragging a segment of the displayed recommended bicycling route to a different location on the map.

13. The method of claim 10, further comprising displaying terrain data on the map including the at least one recommended bicycling route.

14. The method of claim 1, wherein the cycle speed is also based on a mass of a bicycle and a mass of a rider of the bicycle.

15. The method of claim 14, further comprising:
calculating a power output required by a cyclist to traverse the plurality of road segments, wherein the cycle speed is also based on the power output.

16. The method of claim 1, further comprising:
determining that the plurality of road segments have an uphill grade above a predetermined threshold; and
setting, on the determining, the bicyclist's speed for the plurality of road segments equal to a walking speed.

17. The method of claim 1, further comprising:
limiting the bicyclist's speed to a predetermined maximum travel velocity if the bicyclist's speed is estimated to be greater than the maximum travel velocity.

18. A non-transitory computer-readable medium encoded with instructions, that when executed by one or more processors, cause the processor to carry out a process for generating a recommended bicycling route, the process comprising:
applying a cost model to a road network, the cost model including a hill model for estimating a bicyclist's speed on a plurality of road segments in the road network based on a grade of the plurality of road segments;
determining, for the plurality of road segments, a traversal time based on the bicyclist's speed;
receiving an origin and destination;
estimating respective total travel times for one or more estimated bicycling routes between the origin and destination based on the traversal times for the plurality of road segments;
determining at least one recommended bicycling route between the origin and destination based on the respective total travel times; and
formatting the at least one recommended bicycling route for display.

19. The computer-readable medium of claim 18, wherein the cost model further includes a turn model for estimating a length of time for a bicyclist to traverse an intersection.

20. The computer-readable medium of claim 18, wherein the cost model further includes a model for applying a bonus to road segments of the road network that are bike trails.

21. The computer-readable medium of claim 18, wherein the cost model further includes a model for applying a bonus to road segments of the road network that include a bike lane.

22. The computer-readable medium of claim 18, wherein the cost model further includes a model for applying a bonus to road segments of the road network that are designated as good for bicycling.

23. The computer-readable medium of claim 18, wherein the cost model further includes a model for applying a penalty to road segments of the road network that are steep downhill grades.

24. The computer-readable medium of claim 18, wherein the cost model further includes a model for applying a penalty to road segments of a road network that are arterial roads.

25. The computer-readable medium of claim 18, wherein generating at least one recommended bicycling route between the origin and destination based on the application of the cost model to the road network comprises selecting a bicycling route having the lowest cost as a recommended bicycling route.

26. The computer-readable medium of claim 18, wherein formatting the at least one recommended bicycling route for display comprises formatting directions corresponding to the at least one recommended bicycling route.

27. The computer-readable medium of claim 18, wherein formatting the at least one recommended bicycling route for display comprises formatting a map including the at least one recommended bicycling route.

28. The computer-readable medium of claim 27, wherein the map comprises distinguished indicators for bike-only trails, roads with bike lanes, and roads designated as good for bicycling.

29. The computer-readable medium of claim 27, wherein the process further comprises receiving a user modification to a recommended bicycling route displayed on the map, the modification entered by the user dragging a segment of the displayed recommended bicycling route to a different location on the map.

30. The computer-readable medium of claim 18, wherein the process further comprises displaying terrain data on a map including the at least one recommended bicycling route.

* * * * *